United States Patent [19]

Smith

[11] 3,745,835

[45] July 17, 1973

[54] AIR STATIC PRESSURE AND TEMPERATURE MEASURING DEVICE FOR REMOTE LOCATIONS IN STORED POROUS MATERIAL

[75] Inventor: Lloyd L. Smith, Leland, Miss.

[73] Assignee: The United States of America as represented by the Secretary of Agriculture

[22] Filed: Nov. 1, 1971

[21] Appl. No.: 194,363

[52] U.S. Cl.......................... 73/345, 73/420, 285/93
[51] Int. Cl............................ G01l 13/00, G01k 7/04
[58] Field of Search................... 73/345, 420, 212, 73/389; 285/93

[56] References Cited
UNITED STATES PATENTS 2,239,221   4/1941   Dimmock ............................ 73/345
2,858,698   11/1958  Hickey ................................ 73/212
3,043,142   7/1962   Eiland ................................. 73/212

Primary Examiner—Richard C. Queisser
Assistant Examiner—Denis E. Corr
Attorney—R. Hoffman and W. Bier

[57] ABSTRACT

Device for use in measuring positive or negative air static pressure and temperature at remote locations within a mass of porous material more easily and precisely with one probing of the device.

4 Claims, 3 Drawing Figures

AIR STATIC PRESSURE AND TEMPERATURE MEASURING DEVICE FOR REMOTE LOCATIONS IN STORED POROUS MATERIAL

A non-exclusive, irrevocable, royalty-free license in the invention herein described, throughout the world for all purposes of the United States Government, with the power to grant sublicenses for such purposes, is hereby granted to the Government of the United States of America.

The invention relates to and has among its objects the provision of novel means for measuring positive or negative air pressures and temperatures, more particularly for determining the pressures and temperatures at remote locations within a stored mass of aerated porous material. Further objects of the invention will be apparent from the following description taken in conjunction with the appended drawing.

In determining the distribution of air from or to an air moving machine through porous media such as stored cottonseed, one method is to obtain the air static pressures at several locations within the cottonseed. These pressures are then used to calculate the air velocity at the locations measured and inturn determine the amount and distribution of air movement through the cottonseed. Obtaining these air pressure values is a laborious and time consuming operation. Presently a single pressure measuring device is probed manually into the cottonseed to each desired location for determining the static pressures resulting from the flow of air through it. Depending on the density and friction of the cottonseed, the depth of probing is limited to 20 to 30 feet. If a survey of pressure measurements at the selected locations is to be repeated, the entire probing and measuring operation to each point of measurement also must be repeated. A survey of temperature measurements at selected locations is also used to determine temperature pattern changes over a period of time resulting from air movement through the cottonseed.

The prime object of the invention is the provision of apparatus for alleviating the problems outlined above.

Figure 1:
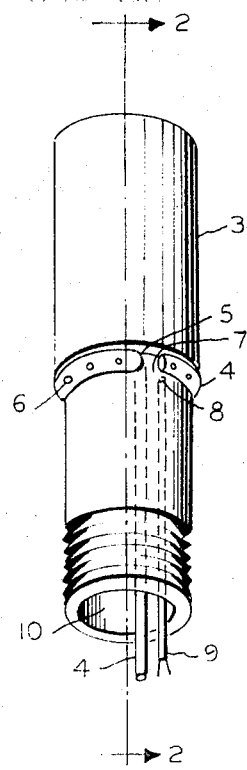
FIG. 1 is an oblique view of the device with the pressure measuring tube and temperature sensor in place.

Referring to FIG. 1 of the appended drawing, reference numeral 1 designates a conventional ½ inch diameter by 2 inch long metal pipe nipple. Reference numeral 3 designates a conventional ½ inch diameter metal pipe coupling. Numeral 4 designates an ⅛ inch outside diameter malleable metal tube and numeral 9 is a 24 gage duplex thermocouple leadwire.

Pipe nipple 1 is screwed tightly onto the pipe coupling 3. A hole, reference numeral 5, is drilled through the pipe nipple 1 near the end of the pipe coupling 3 slightly larger in diameter than the metal tube 4. The metal tube 4 is inserted through the end of the pipe nipple 1 at reference numeral 10 and then through the drilled hole in the pipe at 5. A sufficient length of the metal tube 4 is then formed around the pipe nipple 1, tightly against the end of pipe coupling 3.

A second hole 8, 1/16 inch in diameter, is drilled through pipe nipple 1 close to but clearing the metal tube 4. A thermocouple 7 with leadwire 9 is inserted through the end of the pipe nipple 1 at reference numeral 10 and then through the drilled hole in the pipe at 8, so that thermocouple 7 is level with surface of pipe nipple 1.

Figure 2:
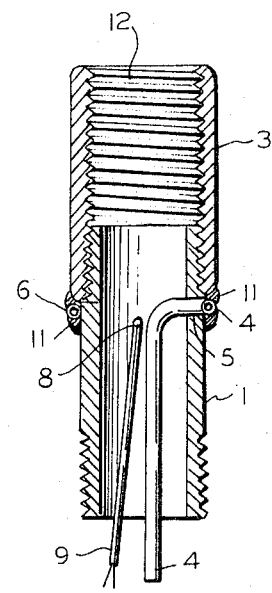
FIG. 2 is a section view illustrating the various parts assembled into an integral unit.

A high bond mastic (epoxy cement) reference numeral 11, FIG. 2, is applied over the metal tube 4 and thermocouple 7 bonding them to pipe nipple 1 and to pipe coupling 3, thus forming one integral unit.

A number (9 or 10) of small holes 1/32 inch in diameter are drilled through the exposed wall of metal tube 4 as indicated by reference numeral 6, thus forming separate air entrances to metal tube 4.

Metal tube 4 extends beyond the end of nipple 1 a sufficient length to enable any desired length of similar metal tube to be attached with a short length of rubber or plastic tubing with an inside diameter slightly smaller than metal tube 4, thus forming an air-tight connection.

The thermocouple leadwire 9 is of sufficient length to extend outside the material being probed so that it can be connected to a temperature measuring instrument.

Figure 3:
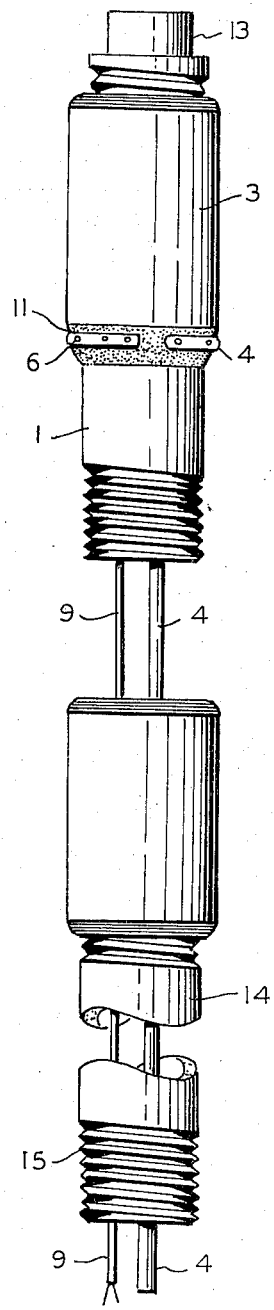
FIG. 3 is a side view illustrating how the measuring device is assembled with other parts for probing into the porous material.

When employing this measuring device, it is used in conjunction with selected lengths of standard ½ inch metal pipe, reference number 4, as seen in FIG. 3 The length of pipe used will determine the space between measuring points for each composite probe of measuring devices and pipe lengths. As many composite probes as necessary are inserted into the means of stored material. It is usually necessary that the composite probes be inserted into the material by some mechanical means, such as a hydraulic cylinder, inclined plane screw device, or some type ram to attain depths or distances of 100 feet or more.

When the device is put to use, the open end 12 of the pipe coupling 3 is closed with a pipe plug 13. See FIG. 3 The desired length of pipe is guided over the thermocouple leadwire 9 and extension metal tube 4 and tightened onto pipe nipple 1. The measuring device, FIG. 1, with the length of pipe attached is then probed vertically, horizontally, or at some angle into the stored cottonseed leaving the end of the extension pipe exposed. A second measuring device, similar to that shown in FIG. 1, is then guided over the thermocouple leadwire 9 and metal tube 4 and tightened onto the threaded end, reference number 15, of the first length of pipe. To the second measuring device is attached another length of pipe 14. The assembled unit is then probed further into the stored material. This process is continued until the desired number of measuring devices are added to make a composite probe assemblage. Additional probe assemblages may be inserted into the stored material at other locations to give the desired survey.

An important facet of the invention is that once inserted the composite probes are left in place until all measurements over a period of time are taken. There is no need for removing and reinserting the measuring device each time a measurement is made.

Although the device of the invention was primarily designed for measuring air static pressures in stored cottonseed, it is obvious that it can be used in other seeds, grains, or porous media through which air may be moved for cooling, drying, or ventilating.

Having thus described the invention, what is claimed is:

1. A probe for simultaneously measuring air static pressure and temperature at a plurality of locations within a mass of particulate solids which comprises a plurality of serially connected probe segments each of said probe segments comprising:
   a. a rigid tubular member having a pair of holes extending through the rigid tube wall;
   b. an elongated flexible tube extending axially within said rigid tubular member, one end of said flexible tube protruding through one of said holes a sufficient length to extend around substantially the complete outer circumference of the rigid tubular member to form a circumscribing collar portion, said collar having a plurality of small holes in the tube wall, the other end of said flexible tube adapted to be connected to remote air pressure measuring means;
   c. means for rigidly securing said collar portion to the rigid tubular member;
   d. temperature sensing means protruding outwardly through the second hole in the wall of the rigid tubular member, said temperature sensing means being rigidly secured to the outer wall of said rigid tubular member;
   e. signal conducting means connected to said temperature sensing means and extending longitudinally through the inside of said rigid tubular member; and
   f. means at one end of said rigid tubular member for securing another similar member, whereby a plurality of said probe segments can be connected end-to-end to form a probe of predetermined length having a plurality of pressure and temperature sensing means along the length thereof.

2. The probe of claim 1 wherein the end of the segment which extends deepest into the mass of particulate material is provided with closure means.

3. The probe of claim 1 wherein the temperature sensing means is a thermocouple.

4. The probe of claim 1 wherein each segment comprises a threaded pipe nipple and the means for connecting additional segments is a threaded pipe sleeve.

* * * * *